UNITED STATES PATENT OFFICE 2,061,774

HYDRAULIC CEMENT AND METHOD OF MAKING SAME

Hans M. Olson, Fallbrook, Calif.

No Drawing. Application January 27, 1936,
Serial No. 61,058

5 Claims. (Cl. 106—25)

This invention relates to a cement and to a method of making same and has as its primary object the provision of a method for effecting the production of a cement having superior properties of water-proofing and plasticity, together with quick setting and strength characteristics.

A further object is to provide a method of manufacturing hydraulic cement having the above stated attributes together with the properties of ready physical miscibility with water and rapid chemical reaction therewith whereby working of the cement in the formation of mortars, plasters, concrete and the like, and the application thereof, will be facilitated and its setting and ultimate hardening accelerated.

In the manufacture of hydraulic cement to impart water proofing qualities thereto it has heretofore been the practice to add an oleaginous substance to the cementitious material during grinding thereof; a highly satisfactory product being obtained by delivering a fine spray or stream of oil, such as petroleum, to the cementitious material while the latter is being ground. The product thus obtained, however, is characterized by high resistance to moisture, and as a consequence offers considerable resistance to the admixture of water therewith and also retards the alkaline reaction of the cement and the setting thereof. To offset the retarded setting of the cement when mixed with water and aggregate it has been the practice to add to the cement at the time of mixing of the cement, water, and aggregate, a chemical which will act to accelerate setting and hardening of the cement. This practice is highly objectionable since uniform admixture of the accelerator with the cement and its proper proportioning relative thereto is difficult of accomplishment especially in the absence of technical knowledge and skill on the part of persons preparing the mix.

The present invention contemplates dispensing with the use of such accelerators yet retaining the advantages thereof by processing the cement during grinding of the cementitious material in a fashion to impart thereto both the water proofing and quick setting properties, which is accomplished by grinding the cementitious material in the presence of a mixture of oil and a gas.

In carrying out the invention to produce a water proof Portland cement, the cement clinker, composed of calcined limestone and alumina produced in the usual fashion in a kiln, is subjected to a grinding action in a tube mill in which the clinker is confined during the grinding operation and is ultimately reduced to a pulverulent form. During this grinding operation a volume of chlorine gas together with a volume of petroleum or other oil is introduced into the mill whereby the grinding of the cementitious material and its reduction to a finely comminuted or pulverulent state will be effected in an atmosphere of chlorine gas and oil vapors, whereby each cement particle, or at least the cement particles in most part, will be exposed to and subjected to the action of the combined mixture of chlorine gas and oil vapors. The pulverized cementitious material being dry and highly absorptive, substantially all of the particles thereof will take up and retain a modicum of the chlorine gas and oil; the grinding operation thoroughly intermixing and intermingling the cement and the chlorine and oil so as to insure uniformity in the resultant product.

During the manufacture of the cement the material may be subjected to several grinding operations to effect its ultimate reduction to the pulverulent form and in carrying out the invention the addition of the chlorine gas and oil is preferably effected during the last grinding operation to which the cement is subjected.

It is manifest however that the grinding of the cementitious material in the presence of chlorine gas and oil may be effected in any one or all of the grinding stages but in order to insure thorough admixture and uniformity of product it is essential that the gas and oil be added to the cement during the final grinding operation.

The adding of the gas and oil may be accomplished in several ways, namely, by directing a mixture of chlorine gas and oil vapors into the grinding chamber of the mill either continuously or from time to time, or by charging the grinding chamber with chlorine gas and thereafter delivering oil vapors into the chamber either continuously or at intervals, or the oil may be first delivered to the charge either before or during the grinding operation, and the grinding chamber thereafter charged with the chlorine gas. It will be noted however that in either event the grinding of the cementitious material will be effected in the presence of both chlorine gas and oil which feature constitutes the essence of the present invention and is highly important since it has been found that the combined action of the chlorine gas and oil absorbed by the cement is to render the product readily miscible in water, quick setting and rapidly hardening. In some instances a dry pulverulent cement product may be treated with the oil and gas mixture by subjecting the material to another grinding action in a tube mill, or other suitable mixing device and the gas and oil added as above stated.

While I have explained the process as applied in the manufacture of Portland cement produced from limestone and alumina, it will be understood that any cementititous material having hydraulic qualities and which give an alkaline reaction is subject to being treated in like fashion, and likewise, lime, gypsum, hydraulic lime, natural cement, oxy-chloride of magnesium, and alkali metal silicate. The term cementitious material as herein employed applies to any of such cements.

While I have referred specifically to petroleum oil, I do not limit myself to this particular type of oil, since the process may be carried into effect by the use of other oleaginous substances either mineral, vegetable or animal, employed either separately or collectively, and in some instances a combination of oils may be used, and while I prefer to use an oil which is normally a liquid I may use an oleaginous substance which is normally a solid or semi-solid, such as wax, tallow, paraffine, bitumin, or any of the fatty acids which are subject to being reduced to liquid and vapors by the application of heat. Furthermore I do not limit myself to the employment of a free oil oleaginous substance of the character above recited, but may employ materials containing an oleaginous constituent, such for example as oil shale, in which event the solids bearing the oil are interground with the cementitious material in the presence of the chlorine gas. In this instance intergrinding of the oil bearing solids with the cement will bring the particles of cement in such intimate contact with the oil bearing particles as to effect absorption by the former of a portion of the oil carried by the latter, and result in a product composed of cement particles charged with chlorine gas and oil bearing pulverulent particles such that when the product is admixed with water the desired admixture of chlorine and oil in the water will be afforded.

In carrying out the process I employ the oleaginous matter in such small quantity in proportion to the volume of the cementitious material as not to destroy the alkaline reaction properties of the latter in the case of hydraulic cements, and in other cements in such quantity as not to negative the setting and bonding properties thereof or to cause segregation on addition of water thereto.

In general an example of such proportion is a quantity of oil or oleaginous matter equal to from one-tenth of one per cent to ten per cent of the weight of the cementitious material, but I do not limit myself to these proportions, as in some cases it may be desirable to vary the amount of oil or oleaginous matter relative to the volume of cementitious material being treated. However, I have found in practice that a highly satisfactory product may be obtained by the present process by employing an oleaginous material consisting of ninety parts of residue mineral oil and ten parts of a fatty acid or beef tallow in the proportion of three-quarters of one per cent by weight of the cementitious material, which is combined with the cement by intergrinding therewith in the presence of chlorine gas.

The amount of chlorine gas employed in proportion to the cementitious material under treatment is subject to considerable variation since in carrying out the invention the materials are subjected to a grinding or mixing action in an atmosphere preferably of full strength chlorine gas of any desired volume; particles of cement absorbing whatever amount of the gas plus the maximum of oleaginous material interground therein of which it is capable of absorbing and carrying. This has been found in some instances to approximate fifteen hundredths of one per cent by weight of the treated mass.

In effecting the combination of the oil and gas with the cement superior results are obtained by subjecting the cement to a grinding action in the presence of the gas while admixing or intergrinding the oil therewith, but in some instances the cement may first be ground with an oleaginous substance and then be worked in an atmosphere of chlorine gas, or vice versa, the essential feature of the invention being to effect incorporation of both an oleaginous substance as a water proofing agent, and chlorine gas as an accelerating medium in the cement product.

The dry cement formed by this process is quite miscible with water and when mixed with water rapidly reacts therewith and on being allowed to stand undisturbed quickly sets and rapidly hardens and forms a relatively water proof body highly resistant to fracture, thus rendering the product highly desirable for use in mortar and plaster, and in the formation of concrete. The cement mixtures are also characterized by great plasticity and subject to being readily worked under a trowel.

Surfaces of bodies formed of the cement are characterized by being highly resistant to penetration by moisture such as not to require superficial water proofing treatment as by the application of surface coatings of water-proofing substances.

What I claim is:
1. The process of preparing a cement product consisting in grinding a cementitious material in the presence of chlorine gas and oil vapors.
2. The process of preparing a cementitious product consisting in intergrinding a dry cementitious material and an oleaginous substance in the presence of chlorine gas.
3. The process of preparing water proof cement consisting in finely comminuting dry cementitious material having alkaline reaction properties and intermixing with the pulverulent cement a mixture of chlorine gas and an oleaginous substance.
4. The process of preparing water proof cement consisting in incorporating with a dry cementitious material while grinding in the presence of an atmosphere of chlorine gas, an oil in such small quantity as not to destroy the alkaline reaction properties of the cement.
5. A cement composition comprising a hydraulic cement having a mixture of oleaginous material and free chlorine incorporated therein.

HANS M. OLSON.